US007505193B2

(12) United States Patent
Kirch et al.

(10) Patent No.: US 7,505,193 B2
(45) Date of Patent: Mar. 17, 2009

(54) LIGHT MODULATOR WITH BI-DIRECTIONAL DRIVE

(75) Inventors: Steven J. Kirch, Pleasanton, CA (US); Kenneth E. Salsman, Pleasanton, CA (US); Thomas E. Willis, Mountain View, CA (US); Oleg Rashkovskiy, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 11/378,568

(22) Filed: Mar. 17, 2006

(65) Prior Publication Data

US 2006/0158443 A1 Jul. 20, 2006

Related U.S. Application Data

(63) Continuation of application No. 10/404,958, filed on Mar. 31, 2003, now Pat. No. 7,019,884.

(51) Int. Cl.
*G02B 26/00* (2006.01)

(52) U.S. Cl. ...................................... 359/290; 359/291

(58) Field of Classification Search ................. 359/290, 359/291, 292, 224; 349/139, 147, 153, 155
See application file for complete search history.

(56) References Cited

U.S. PATENT DOCUMENTS

| | | | |
|---|---|---|---|
| 5,347,382 | A | 9/1994 | Rumbaugh |
| 5,615,027 | A | 3/1997 | Kuribayashi |
| 5,644,327 | A | 7/1997 | Salsman et al. |
| 5,748,379 | A | 5/1998 | Salsman et al. |
| 5,798,948 | A | 8/1998 | Rashkovskiy |
| 5,880,705 | A | 3/1999 | Salsman et al. |
| 6,049,403 | A | 4/2000 | Salsman |
| 6,069,972 | A | 5/2000 | Rashkovskiy et al. |
| 6,181,376 | B1 | 1/2001 | Rashkovskiy |
| 6,184,852 | B1 | 2/2001 | Milward |

(Continued)

FOREIGN PATENT DOCUMENTS

| | | |
|---|---|---|
| EP | 0-660297 | 6/1995 |

(Continued)

OTHER PUBLICATIONS

Editor: B. Bachadur, Liquid Crystals, Applications and Uses vol. 3 1992, p. 217-218.

(Continued)

*Primary Examiner*—Hung X Dang
*Assistant Examiner*—Tuyen Q Tra
(74) *Attorney, Agent, or Firm*—Kevin A. Reif

(57) ABSTRACT

A spatial light modulator may be adapted to receive bi-directional drive signals. The spatial light modulator may include a plurality of pixel elements having individual first electrodes and a common electrode providing a second electrode for each of the pixel elements. The pixel elements may be adapted to change between a first state and a second state in accordance with signals applied thereto, and the bi-directional drive signals may include at least a first drive signal and a second drive signal. Both drive signals are applied to change the pixel elements from the first state to the second state and from the second state to the first state.

13 Claims, 5 Drawing Sheets

U.S. PATENT DOCUMENTS

| | | | |
|---|---|---|---|
| 6,198,523 | B1 | 3/2001 | Helbing |
| 6,208,392 | B1 | 3/2001 | Miller |
| 6,212,304 | B1 | 4/2001 | Rashkovskiy |
| 6,215,534 | B1 | 4/2001 | Raj |
| 6,252,577 | B1 | 6/2001 | Rashkovskiy et al. |
| 6,346,430 | B1 | 2/2002 | Raj |
| 6,359,643 | B1 | 3/2002 | Rashovskiy et al. |
| 6,377,099 | B1 | 4/2002 | Cairns |
| 6,563,536 | B1 | 5/2003 | Rashkovskiy et al. |
| 6,672,722 | B2 | 1/2004 | Salsman et al. |
| 6,721,077 | B2 | 4/2004 | Salsman et al. |
| 6,728,858 | B2 | 4/2004 | Willis |
| 6,779,893 | B2 | 8/2004 | Salsman et al. |
| 6,795,064 | B2 | 9/2004 | Walker |
| 6,806,987 | B2 | 10/2004 | Salsman et al. |
| 6,888,551 | B2 | 5/2005 | Willis |
| 6,934,064 | B2 | 8/2005 | Salsman et al. |
| 6,995,756 | B2 | 2/2006 | Willis |
| 6,995,771 | B2 | 2/2006 | Willis |
| 7,006,233 | B2 | 2/2006 | Salsman et al. |
| 2002/0087844 | A1 | 7/2002 | Willis |
| 2002/0126751 | A1 | 9/2002 | Willis |
| 2002/0144079 | A1 | 10/2002 | Willis |
| 2003/0107578 | A1 | 6/2003 | Willis et al. |
| 2003/0107579 | A1 | 6/2003 | Willis et al. |
| 2003/0143838 | A1 | 7/2003 | Kozhukh et al. |
| 2003/0156083 | A1 | 8/2003 | Willis |
| 2003/0160803 | A1 | 8/2003 | Willis |
| 2003/0160804 | A1 | 8/2003 | Willis |
| 2003/0201986 | A1 | 10/2003 | Willis |
| 2004/0036707 | A1 | 2/2004 | Willis |
| 2004/0038523 | A1 | 2/2004 | Willis |
| 2004/0041825 | A1 | 3/2004 | Willis |
| 2004/0046752 | A1 | 3/2004 | Willis |
| 2004/0064654 | A1 | 4/2004 | Willis |
| 2004/0125093 | A1 | 7/2004 | Willis |
| 2004/0125283 | A1 | 7/2004 | Willis |
| 2004/0179155 | A1 | 9/2004 | Willis |
| 2004/0184730 | A1 | 9/2004 | Willis |
| 2004/0189582 | A1 | 9/2004 | Kirch |
| 2005/0030608 | A1 | 2/2005 | Salsman et al. |
| 2005/0068277 | A1 | 3/2005 | Salsman |
| 2005/0195208 | A1 | 9/2005 | Willis |
| 2005/0225824 | A1 | 10/2005 | Salsman |
| 2005/0278582 | A1 | 12/2005 | Willis |
| 2006/0033997 | A1 | 2/2006 | Salsman |
| 2006/0038802 | A1 | 2/2006 | Willis |
| 2006/0038808 | A1 | 2/2006 | Willis |

FOREIGN PATENT DOCUMENTS

| | | |
|---|---|---|
| EP | 11-133930 | 5/1999 |
| JP | 10-177162 | 6/1999 |

OTHER PUBLICATIONS

Taiwan Office Action dated Aug. 11, 2005.

LIGHT MODULATOR WITH BI-DIRECTIONAL DRIVE

The present application is a continuation of U.S. patent application Ser. No. 10/404,958, filed Mar. 31, 2003, now U.S. Pat. No. 7,019,884, issued on Mar. 28, 2006.

FIELD OF THE INVENTION

The invention relates to light modulators, and more particularly to novel light modulator structures and drive circuits.

BACKGROUND AND RELATED ART

Various light modulator structures are well known in the art. Such structures includes liquid crystal displays (LCDs), light emitting diodes (LEDs), and micro-electronic mirror systems (MEMS). LCDs may be reflective or transmissive. Crystalline silicon may be used to manufacture liquid crystal on silicon (LCOS) displays.

With reference to FIG. 1, a conventional display system 10 includes a spatial light modulator (SLM) 12 connected to a drive circuit 14. The drive circuit 14 provides a drive signal 16 to the SLM 12.

With reference to FIG. 2, in a liquid crystal display system 20, liquid crystal material 22 is positioned between two electrodes 23 and 24. The liquid crystal material includes crystals 25 which are affected by the voltage applied across the two electrodes 23 and 24. One electrode 23 is grounded and the other electrode 24 is connected to a drive signal. For example, the drive signal may be a DC voltage signal. In the example illustrated in FIG. 2, when a voltage of zero volts (0 V) is applied to the electrode 24 the crystals 25 lie in a plane approximately parallel to the plane of the electrodes 23 and 24.

With reference to FIG. 3, changing the state of the voltage applied to the electrode 24 causes a corresponding change to the state of the crystals 25. In the example illustrated in FIG. 3, when a voltage of three volts (3 V) is applied to the electrode 24 the crystals 25 change their orientation to lie in a plane approximately perpendicular to the plane of the electrodes 23 and 24. Changing the orientation of the crystals 25 changes the polarization properties of the liquid crystal material 22.

With reference to FIG. 4, a drive signal 40 has a voltage of 0 V at time T0, changing to Von at time T1 and back to 0 V at time T2. When the drive signal changes voltage levels, the liquid crystal material 22 transitions between respective parallel and perpendicular orientations of the crystals 25. For example, one orientation corresponds to an ON state for a pixel element (e.g. a dark spot on the LCD) and the other orientation corresponds to an OFF state for the pixel element (e.g. a light spot on the LCD).

With reference to FIGS. 5-6, for an LCD system 50 the change from one orientation to another in one direction is relatively fast (see FIG. 5) while the change in the other direction is much slower (see FIG. 6). The relatively slower transition is limited by the relaxation properties of the liquid crystal material. The response time is related to the fluid dynamics. MEMS systems have similar mechanical properties where one orientation of the reflective element is influenced by an applied signal and the other orientation is dependent on mechanical restoring forces.

An important performance aspect of an SLM display system is the response time of the SLM. With reference to FIG. 7, a drive signal V is represented by the dashed line and the response time of the SLM is represented by the solid line. The horizontal axis T corresponds to time and the vertical axis A corresponds to normalized amplitudes of the drive signal and the ON state of the pixel. When a drive signal V is applied, the response time of the SLM under the influence of the applied signal (e.g. 3 V) is very fast, as represented by the steep ramp R in the graph. When the applied signal is removed (e.g. 0 V), the SLM relies on natural restoring forces to return the pixels to their original state. This transition is relatively slower, as represented by the curve C in the graph. LCDs, MEMS, and other conventional display systems all may have a response graph similar to the graph of FIG. 7.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 8:
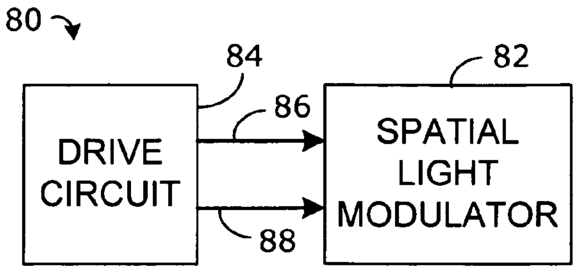
FIG. 8 is a block diagram of a display system with bi-directional drive according to some embodiments of the invention.

With reference to FIG. 8, an SLM system 80 according to some embodiments of the invention includes a spatial light modulator 82 connected to a drive circuit 84. The drive circuit provides at least two drive signals 86 and 88 to the SLM 82. According to some embodiments of the invention, the two drive signals are applied to influence the switching between pixel states from the OFF state to the ON state and from the ON state to the OFF state. For example, in an SLM system where the switch from one state to another is relatively slower, an applied drive signal for both pixel transitions may reduce the transition time in the relatively slower direction.

In conventional systems, an electric field is applied in one direction (e.g. from the OFF to the ON state) and the natural restoring forces are relied upon in the other direction (e.g. from the ON state to the OFF state). In contrast, some embodiments of the present invention utilize an applied electric field in both directions. In some embodiments of the invention, a more symmetric LC response curve is provided and therefore the SLM exhibits a more linear response when operated at higher speeds (e.g. in a single chip light modulator).

In an LC system according to some embodiments of the invention, a reversed electric field is applied to the electrodes to accelerate the liquid crystal switching to an OFF state. An advantage of applying the reversed electric field is that the transition from ON to OFF for the LC material may be much faster than in conventional systems. The ON to OFF transition is typically the rate limiting step of LC operation. For example, in an LC system which regularly updates the display image, a field reversal is applied just prior to each update to accelerate the switch of the pixels from the ON state to the OFF state. Depending on the particular LC system, various voltage levels and LC states may correspond to respective ON and OFF states. In some systems, it may be useful to invert the signals every other frame for DC balance. In some systems or under some circumstances, the relatively slower transition may correspond to a transition from the OFF state to the ON state.

In some embodiments of the invention, the transition of the LC material to the OFF state is accelerated by briefly switching the voltage on the common electrode to an appropriate voltage (e.g. a negative voltage) selected to cause the desired electric field. Preferably, the duration of the voltage switch is sufficient to move the crystals from their ON state orientation to an in-between orientation corresponding to roughly half way off. The relaxation to the completely OFF state is much faster from the in-between orientation than from the fully ON state. Because the common electrode influences all of the pixels, the crystals which are already in the OFF state may also react to the brief electric field change (e.g. begin to switch to the ON state). However, those pixels which remain in the OFF state in the next frame would react only briefly and then relax back to the OFF state. The brevity of the reaction would not substantially affect the overall contrast of the device.

Figure 9:
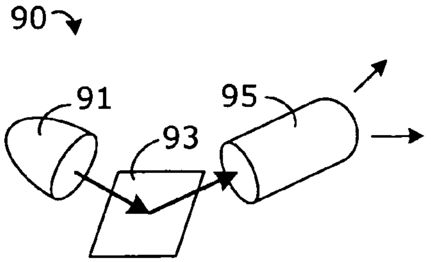
FIG. 9 is a block diagram of a projection display system according to some embodiments of the invention.

With reference to FIG. 9, a display system 90 according to some embodiments of the invention includes a light engine 91, an SLM imaging device 93 receiving light from the light and encoding the light with image information, and a projection lens 95 receiving the encoded light from the SLM imaging device 93 and projecting the encoded light. In some embodiments, the SLM imaging device 93 is adapted to receive two drive signals which are applied to influence the switching between pixel states from the OFF state to the ON state and from the ON state to the OFF state. For example, the system 90 may incorporate various features of the invention described herein.

An example operation of a liquid crystal system 100 in accordance with some embodiments of the invention is described below with reference to FIGS. 10-13. For example, the liquid crystal system may be a liquid crystal on silicon (LCOS) system or a liquid crystal display (LCD) system. The liquid crystal system 100 includes a common electrode 104 made from indium titanium oxide (ITO) and a plurality of individual electrodes 103 positioned opposite of the common electrode 104 with liquid crystal (LC) material 102 positioned between the common electrode 104 and the individual electrodes 103. The LC system 100 is operated by at least two drive signals S1 and S2. One drive signal S1 is connected to the common electrode 104 and the other drive signal S2 is representative of the drive signals provided to individual pixel elements in accordance with the desired state of the pixel element.

Figure 1:
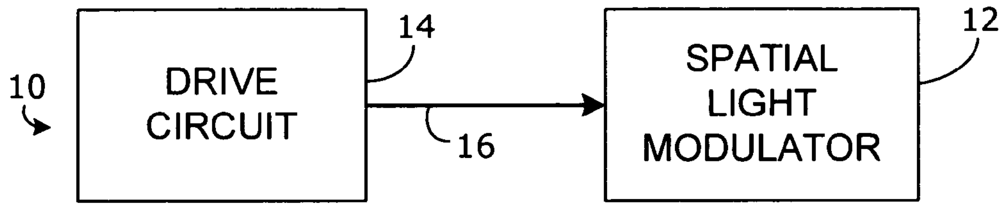
Fig. 1 PRIOR ART
FIG. 1 is a block diagram of a conventional display system.
Figure 2:
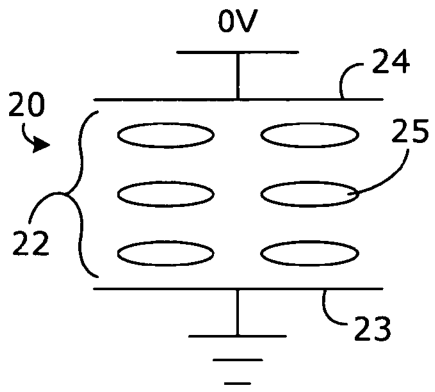
FIG. 2 is a schematic representation of a liquid crystal display system in a first state.
Figure 3:
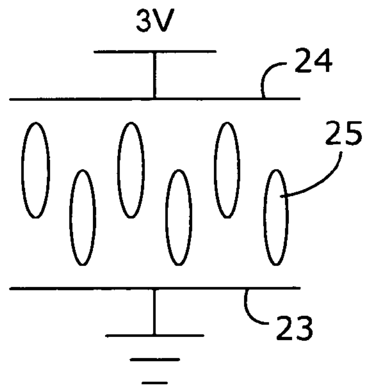
FIG. 3 is a schematic representation of a liquid crystal display system in a second state.
Figure 4:
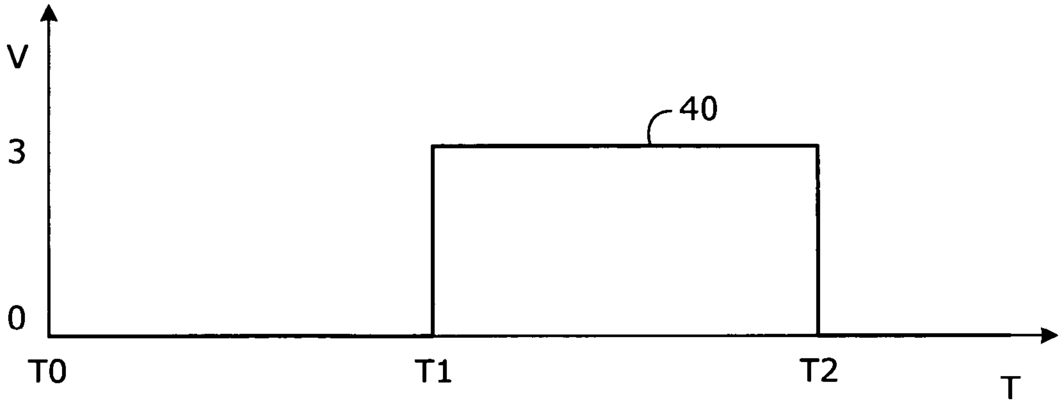
FIG. 4 is a representative timing diagram of a drive signal.
Figure 5:
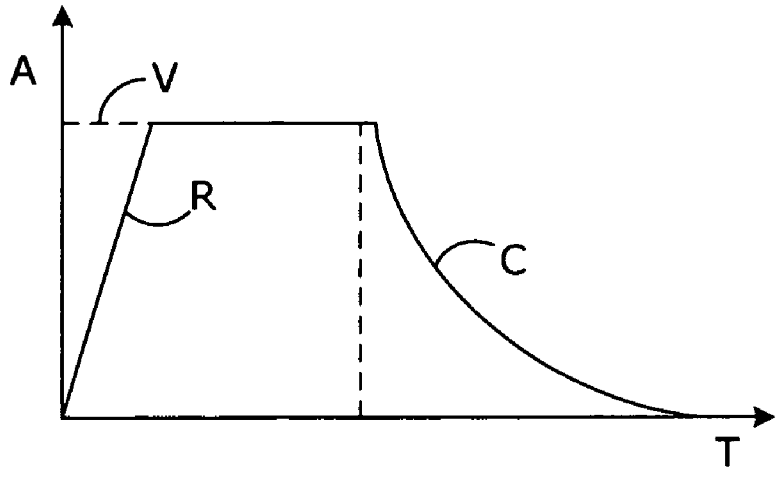
FIG. 5 is a representative graph of response time of an SLM system.
Figure 6:
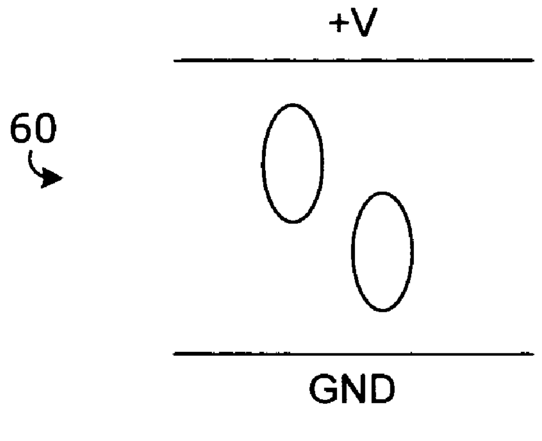
FIG. 6 is a schematic representation of a liquid crystal display system in a stable state.
Figure 7:
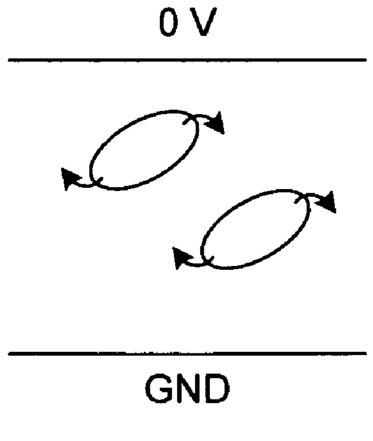
FIG. 7 is a schematic representation of a liquid crystal display system in a transitional state.
Figure 10:
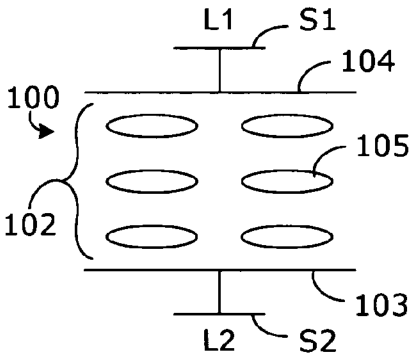
FIG. 10 is a schematic representation of a liquid crystal display system in a first state, according to some embodiments of the invention.
Figure 11:
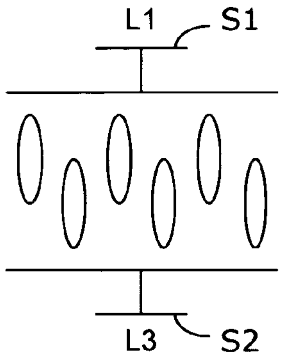
FIG. 11 is a schematic representation of a liquid crystal display system in a second state, according to some embodiments of the invention.
Figure 12:
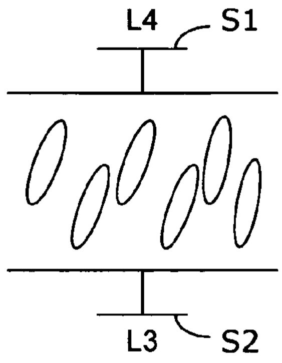
FIG. 12 is a schematic representation of a liquid crystal display system in a third state, according to some embodiments of the invention.
Figure 13:
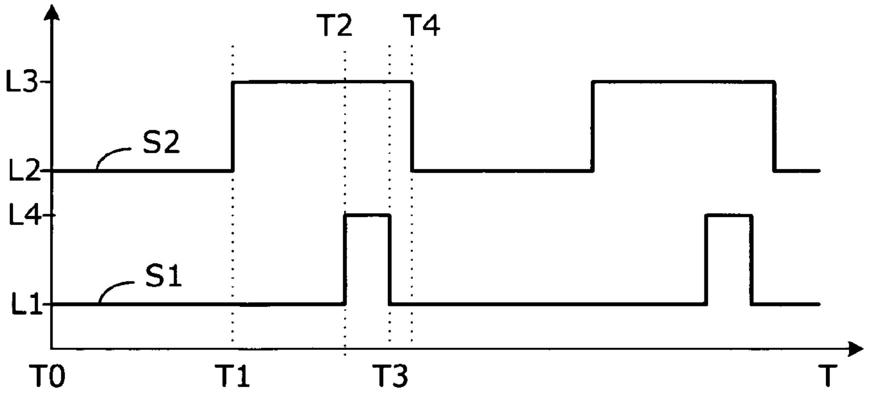
FIG. 13 is a representative timing diagram for bi-directional drive signals, according to some embodiments of the invention.

With reference to FIG. 13, at time T0, the signal S1 has a level L1 and the signal S2 has a level L2. The signal level L2 for the signal S2 corresponds to a first state for the pixel element (e.g. an OFF state), as shown in FIG. 10. At time T1, the signal S2 changes to a level L3, which causes the LC material to change to an orientation corresponding to a second state for the pixel element (e.g. an ON state), as shown in FIG. 11. At time T2, the drive signal S1 on the common electrode changes to a level L4, which causes the LC material to change orientation to a third state which is in-between the first state and the second state, as shown in FIG. 12. At time T3, the signal S1 returns to level L1, and the next state for the pixel element is determined by the signal S2 in accordance with a desired state of the pixel element. The period of time between times T2 and T3 is relatively brief as compared to the period time between times T1 and T4. Preferably, the time period between times T2 and T3 is less than half the transition time for the faster transition between the two states (e.g. less than half the ramp time for the ramp R in FIG. 5). In the illustrated example, at time T4, the signal S2 changes to the level L2, which corresponds to the first state for the pixel element. Advantageously, the drive signal S1 biases the LC material towards the first state and the transition is faster from the third state to the first state as compared to the transition time from the second state to the first state.

Figure 14:
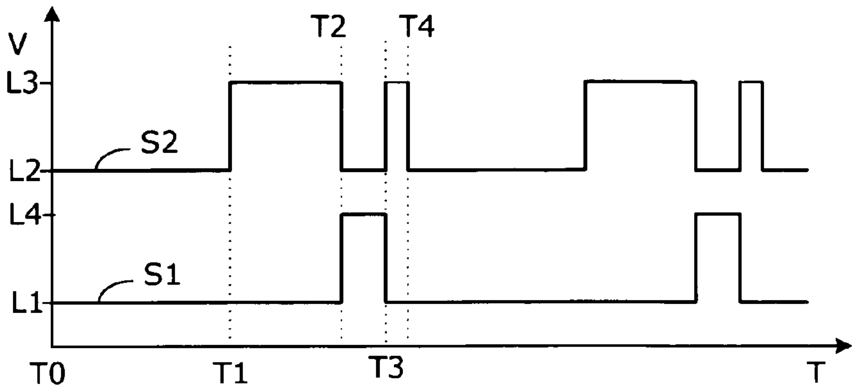
FIG. 14 is another representative timing diagram for bi-directional drive signals, according to some embodiments of the invention.

With reference to FIG. 14, another representative timing diagram is illustrated for a system according to some embodiments of the invention, where both drive signals are utilized to influence the switching. At time T0, the signal S1 has a level L1 and the signal S2 has a level L2. The signal level L2 for the signal S2 corresponds to a first state for the pixel element (e.g. an OFF state). At time T1, the signal S2 changes to a level L3, which causes the LC material to change to an orientation corresponding to a second state for the pixel element (e.g. an ON state). At time T2, the drive signal S1 on the common electrode changes to a level L4 and the drive signal S2 changes to level L2, which causes the LC material to change orientation to a third state which is in-between the first state and the second state. At time T3, the signal S1 returns to level L1 and the signal S2 returns to level L3, and the next state for the pixel element is determined by the signal S2 in accordance with a desired state of the pixel element. The period of time between times T2 and T3 is relatively brief as compared to the period time between times T1 and T4. Preferably, the time period between times T2 and T3 is less than half the transition time for the faster transition between the two states (e.g. less than half the ramp time for the ramp R in FIG. 5). In the illustrated example, at time T4, the signal S2 changes to the level L2, which corresponds to the first state for the pixel element. Advantageously, the drive signals S1 and S2 bias the LC material towards the first state and the transition is faster from the third state to the first state as compared to the transition time from the second state to the first state.

Figure 15:
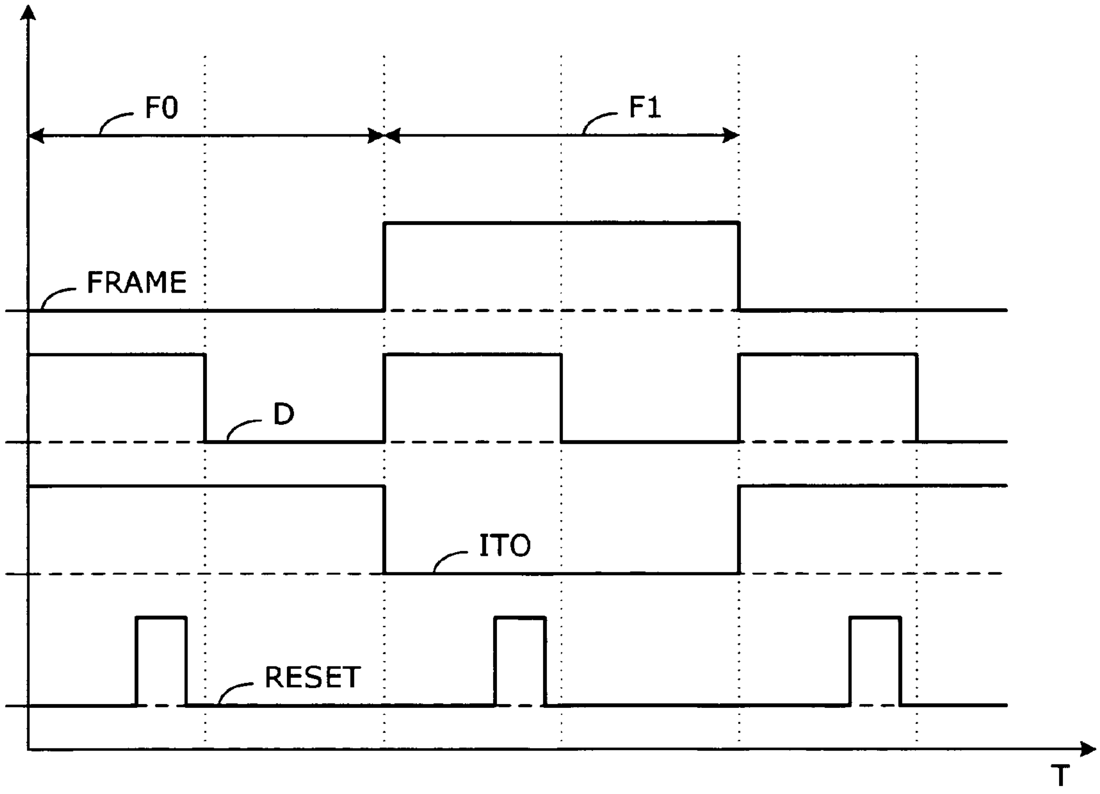
FIG. 15 is a representative timing diagram for various display system signals, according to some embodiments of the invention.

With reference to FIG. 15, another representative timing diagram is illustrated for a system according to some embodiments of the invention, where DC balanced drive signals are utilized to influence the switching. A signal FRAME is low for an initial display frame F0 and high for a next display frame F1. A drive signal ITO is inverted every other frame. A representative drive signal D is active for part of each frame in accordance with a desired state of a corresponding pixel element. A signal RESET is pulsed briefly just prior to the transition of the D signal from the ON state to the OFF state (e.g. if ON to OFF is the slower transition). In this example, no RESET pulse is applied for the other transition, although in some examples it may be desirable to drive the transition in both directions. For those transitions where the RESET pulse is applied, the transition is faster from the ON state to the OFF state for the corresponding pixel element.

Those skilled in the art will appreciate that the timing diagrams illustrated in FIGS. 13-15 are representative only and not to scale. Specifically, the duration of the pulse on S1 may be much less than duration of the pulse on S2 and may appear only as a spike in a timing diagram which is to scale. Also, the various signals levels L1-L4 may have various values as would be appropriate for the particular system utilizing the invention. For example, L1 and L2 may both be zero volts (0 V), while L3 may be three volts (3 V) and L4 may be a negative voltage. The duration of the RESET pulse is likewise very short compared to the frame time and may only appear as a spike in a timing diagram which is more to scale and occurring just prior to transition.

In some of the foregoing examples, a substantially perpendicular electric field between the pixel electrode and the common electrode is utilized to accelerate the ON to OFF switching. According to some embodiments of the invention, a transverse electric field may be utilized to influence the switching in one or both directions. For example, U.S. Pat. No. 6,215,534 describes an electro-optical device including two pairs of electrodes which apply electric fields at angle with respect to one another.

Figure 16:
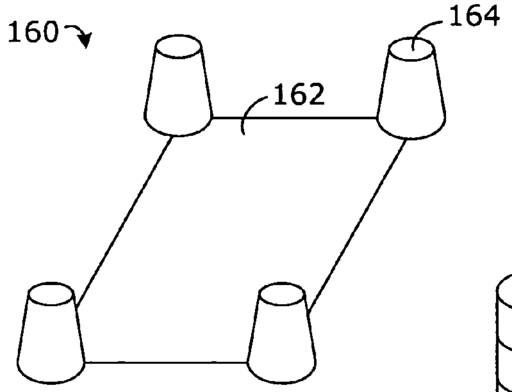
FIG. 16 is a perspective view of an electrode structure, according to some embodiments of the invention.

With reference to FIG. 16, an LC system 160 includes a pixel element 162 and a plurality of conductive standoffs 164 positioned around the periphery of the pixel element 162. The LC system further includes pixel electrodes, a common electrode, and liquid crystal material disposed between the electrodes (not illustrated). The standoffs 164 may further function as spacers for the cover glass. Further details regarding the device structure may be had by reference to the '534 patent. According to some embodiments of the invention, the device structure of the '534 patent is adapted to briefly apply a transverse electric field between the standoffs 164 and/or the other electrodes to accelerate the switching from a first state of the pixel element (e.g. the ON state) to a second state of the pixel element (e.g. an OFF state). For example, the second drive signal and/or the reset pulse from the above examples may be applied to the standoffs 164 with appropriate voltage levels to create the desired transverse electric field.

Figure 17:
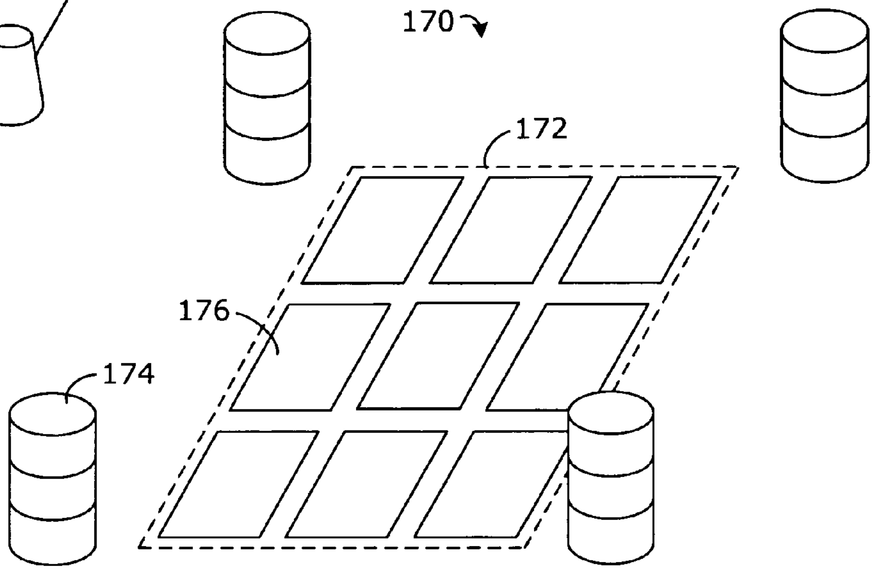
FIG. 17 is a perspective view of a multiple element pixel, according to some embodiments of the invention.

According to another aspect of the invention, additional field control is provided by dividing the pixel element into two or more sub-pixel elements. Each sub-pixel may have its own independent electrode. Alternatively, two or more sub-pixels may share an electrode. For example, there may be three additional electrodes, one per row or two electrodes with one for the center sub-pixel and one for the other sub-pixels. With reference to FIG. 17, an SLM system 170 includes a pixel element 172 and a plurality of conductive standoffs 174. The pixel element 172 is divided into a plurality of sub-pixel elements 176. As illustrated, the pixel element 172 is divided into nine sub-pixel elements 176 arranged as a three-by-three array.

The combination of the opposed pixel and common electrodes together with the conductive standoffs 174 provides a pixel electrode structure which can produce three dimensional electric fields across the pixel element 172. For example, the opposed pixel and common electrodes produce electric fields which are substantially perpendicular to the pixel element 172 while the standoffs 174 can work with each other or the pixel and/or common electrodes to produce electric fields which are transverse to the pixel element 172. The three dimensional field control can be used to improve the switching speed, as described above, and also for contrast control and/or fringe control. For example, the potential across the respective sub-pixel elements 176 may be different from each other, thereby producing different reflective properties for each sub-pixel element. To improve switching speed and/or other properties of the pixel element, outer sub-pixels may be adapted to control the field across intermediate sub-pixels.

For example, in an LC system, the LC material in the OFF state has crystals which lie parallel to the plane of the pixel element. In the ON state, an electric field is applied between the pixel electrode and the common, causing the crystals to move to a perpendicular orientation. To go to the OFF state, the electric field is removed. The OFF and ON designations are representative and either state could be dark or bright. In some embodiments of the invention, the transition to the OFF state is accelerated by the application of a transverse electric field (e.g. substantially parallel to the face of the pixel element 172) for a brief time between the standoffs 174. For example, the standoffs 174 have incorporated wiring structure used to create a lateral electric field.

Figure 18:
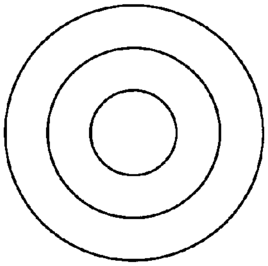
FIG. 18 is a schematic representation of a multiple element pixel, according to some embodiments of the invention.
Figure 19:
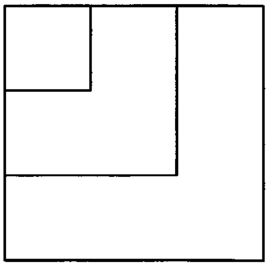
FIG. 19 is another schematic representation of a multiple element pixel, according to some embodiments of the invention.

The combination of multi-pixel elements and electrically active integrated spacers creates a three dimensional electric field for precise LC control. Such precise control may be advantageous for better switching speed, control and stability for complex LC structures (e.g. vertically aligned nematic LC). With reference to FIG. 18, a pixel element may have any useful configuration including a plurality of concentric sub-pixel elements. With reference to FIG. 19, another example pixel element has L-shaped sub-pixel elements.

The foregoing and other aspects of the invention are achieved individually and in combination. The invention should not be construed as requiring two or more of the such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A method, comprising:

providing a first drive signal coupled to a common electrode of a plurality of pixel elements of a spatial light modulator;

providing a set of second drive signals, with a respective second drive signal coupled t a respective individual pixel element; and changing the states of the plurality of pixel elements from respective first to second states and from respective second states to first states within a frame period by applying both the first and second drive signal to the pixel elements.

2. The method of claim 1, wherein changing the states of the plurality of pixel elements comprises:

at an initial time within the frame period, providing the first drive signal with a first level and providing the second drive signal with a second level, where the second level for the second drive signal corresponds to a first state for a pixel element;

at a first time within the frame period after the initial time, changing the second drive signal to a third level, different from the second level, where the third level corresponds to a second state for the pixel element;

at a second time within the frame period after the first time changing the first dive signal on the common electrode to a fourth level, different from the first level, which causes the pixel element to transition to a third state which is in-between the first state and the second state; and at a third time within the frame period after the second time, changing the first drive signal back to the first level 3. The method of claim 2, wherein the first drive signal biases the pixel elements towards the first state and the transition is faster from the third state to the first state as compared to the transition time from the second state to the first state.

4. The method of claim 2, wherein the period of time between the second and third times is relatively brief as compared to the period of time between the first time and the end of the frame period.

5. The method of claim 4, wherein one of a transition time from the first to the second state and a transition time from the second to the first state is a relatively faster transition time, and wherein the period of time between the second and third times is less than half the relatively faster transition time between the first and second states.

6. An apparatus comprising:

a spatial light modulator adapted to receive bi-directional drive signals, the spatial light modulator including;

a plurality of pixel elements having individual first electrodes; and a common electrode providing a second electrode for each of the pixel elements, wherein the pixel elements are adapted to change between a first state and a second state in accordance with signals applied thereto, and wherein the bi-directional drive signals comprise at least a first drive signal and a second drive signal and both drive signals are applied to change the pixel elements from the first state to the second state and from the second state to the first state.

7. The apparatus of claim 6, wherein:

the first drive signal is coupled to the common electrode; and the second drive signal comprises a set of second dive signals, with a respective second drive signal coupled to a respective individual pixel element.

8. The apparatus of claim 7, further comprising:

a drive circuit adapted to:

at an initial time with the frame period, change the first drive signal to a first level and the second drive signal to a second level, where the second level for the second drive signal corresponds to a first state for the pixel element;

at a first time within the frame period after the initial time, change the second drive signal to a third level, different from the second level, where the third level corresponds to a second state for the pixel element;

at a second time within the frame period after the first change the first drive signal on the common electrode to a fourth level, different from the first level, and change the second drive signal to the second level, which is adapted to cause the pixel element to transition to a third state which is in-between the first state and the second state; and at a third time within the frame period after the second time, change the first drive signal back to the first level and change the second drive signal back to the third level.

9. The apparatus of claim 8 of wherein the first and second drive signals bias the pixel elements towards the first state and the transition is faster from the third state to the first state as compared to the transition time from the second state to the first state.

10. The apparatus of claim 8, the period of time between the second and third times is relatively brief as compared to the period if time between the first time and the end of the frame period.

11. The apparatus of claim 10, wherein one of a transition time from the first to the second state and a transition time from the second to the first state is a relatively faster transition time, and wherein the period of time between the second and third times is less than half the relatively faster transition time between the first and second states.

12. The apparatus of claim 6, wherein the spatial light modulator comprises a micro-electronic mirror device.

13. The apparatus of claim 6, wherein the spatial light modulator comprises a liquid crystal device.

* * * * *